United States Patent
Kim et al.

(10) Patent No.: US 8,522,169 B2
(45) Date of Patent: Aug. 27, 2013

(54) DISPLAYING WEB PAGE ON MOBILE COMMUNICATION TERMINAL

(75) Inventors: Jin Woo Kim, Seoul (KR); Ji Young Park, Kyunggi-do (KR); Mee Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1297 days.

(21) Appl. No.: 12/016,898

(22) Filed: Jan. 18, 2008

(65) Prior Publication Data

US 2008/0282173 A1 Nov. 13, 2008

(30) Foreign Application Priority Data

May 9, 2007 (KR) .................. 10-2007-0045071

(51) Int. Cl.
*G06F 3/14* (2006.01)
*G06F 3/00* (2006.01)
*G06F 3/048* (2013.01)

(52) U.S. Cl.
USPC ............ 715/864; 715/744; 715/747; 715/786

(58) Field of Classification Search
USPC ........................................ 715/744, 747, 786
See application file for complete search history.

(56) References Cited

U.S. PATENT DOCUMENTS

| | | | | |
|---|---|---|---|---|
| 5,995,102 | A * | 11/1999 | Rosen et al. ................. | 715/856 |
| 6,212,536 | B1 * | 4/2001 | Klassen et al. ............... | 715/205 |
| 6,215,491 | B1 * | 4/2001 | Gould ........................... | 345/660 |
| 6,266,684 | B1 * | 7/2001 | Kraus et al. .................. | 715/209 |
| 6,300,947 | B1 * | 10/2001 | Kanevsky ..................... | 715/866 |
| 6,313,848 | B1 * | 11/2001 | Hoag ............................ | 345/684 |
| 6,448,985 | B1 * | 9/2002 | McNally ....................... | 715/784 |
| 6,633,851 | B1 * | 10/2003 | Engler et al. ................. | 705/21 |
| 7,058,889 | B2 * | 6/2006 | Trovato et al. ............... | 715/716 |
| 7,441,207 | B2 * | 10/2008 | Filner et al. .................. | 715/864 |
| 7,614,017 | B2 * | 11/2009 | Misawa et al. ............... | 715/856 |
| 7,681,129 | B2 * | 3/2010 | Cragun ......................... | 715/728 |
| 2002/0032699 | A1 * | 3/2002 | Edwards et al. ............. | 707/513 |
| 2002/0194150 | A1 * | 12/2002 | Bates et al. ....................... | 707/1 |
| 2004/0100510 | A1 * | 5/2004 | Milic-Frayling et al. ..... | 345/864 |
| 2005/0172226 | A1 * | 8/2005 | Kobashi et al. .............. | 715/518 |
| 2005/0216858 | A1 * | 9/2005 | Fabritius ....................... | 715/802 |
| 2006/0036955 | A1 * | 2/2006 | Baudisch et al. ............. | 715/747 |
| 2006/0059432 | A1 * | 3/2006 | Bells ............................. | 715/768 |
| 2007/0240081 | A1 * | 10/2007 | Grossman et al. ............ | 715/854 |
| 2008/0040683 | A1 * | 2/2008 | Walsh ........................... | 715/786 |
| 2008/0082938 | A1 * | 4/2008 | Buczek ......................... | 715/784 |
| 2008/0168381 | A1 * | 7/2008 | Nelson et al. ................. | 715/780 |

* cited by examiner

*Primary Examiner* — Stephen Alvesteffer

(74) *Attorney, Agent, or Firm* — Birch, Stewart, Kolasch & Birch, LLP

(57) ABSTRACT

A method of controlling a mobile communication terminal. The method includes receiving a web page, displaying, on a display screen of the terminal, a first display window which displays one part of the received web page and a second display window which displays another part of the received web page, and generating a scroll bar in at least one of the first and second display windows so at least one of the one part and the another part of the web page can be scrolled using the scroll bar.

24 Claims, 14 Drawing Sheets

DISPLAYING WEB PAGE ON MOBILE COMMUNICATION TERMINAL

This application claims priority to Korean Patent Application No. 10-2007-0045071 filed on May 9, 2007 in Korea, the entire contents of which is incorporated herein by reference in its entirety.

BACKGROUND OF THE INVENTION

1. Field of the Invention

The present invention relates to a mobile communication terminal and corresponding method allowing a user to divide a displayed web page into one or more sub-web pages of a size desired by the user of the mobile communication terminal.

2. Description of the Related Art

Mobile communication devices such as mobile phones or personal digital assistants (PDAs) provide not only basic functions such as voice call and Short Message Service (SMS) functions, but also various additional functions. Further, mobile terminals now include Phase change Random Access Memory (PRAM) chips as core chips and ultra high pixel Complementary Metal-Oxide Semiconductor (CMOS) chips as camera modules.

In addition, mobile terminals can also be used to access the Internet. Therefore, a user of the terminal can access and view a plurality of different web pages. However, because a web page to be displayed is generally larger than a screen of a display unit included in the terminal, the user has difficulty in viewing a web page.

SUMMARY OF THE INVENTION

Accordingly, one object of the present invention is to address the above-noted and other problems.

Another object of the present invention is to provide a mobile terminal and corresponding method which allows a user to divide a web page into one or more sub-web pages and selectively view the sub-web pages.

To achieve these and other advantages and in accordance with the purpose of the present invention, as embodied and broadly described herein, the present invention provides in one aspect a method of controlling a mobile communication terminal. The method includes receiving a web page, displaying, on a display screen of the terminal, a first display window which displays one part of the received web page and a second display window which displays another part of the received web page, and generating a scroll bar in at least one of the first and second display windows so at least one of the one part and the another part of the web page can be scrolled using the scroll bar.

In another aspect, the present invention provides a mobile communication terminal, which includes a wireless communication unit configured to receive a web page, a display unit including a display screen configured to display a first display window which displays one part of the received web page and a second display window which displays another part of the received web page, and a control unit configured to generate a scroll bar in at least one of the first and second display windows so at least one of the one part and the another part of the web page can be scrolled using the scroll bar.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
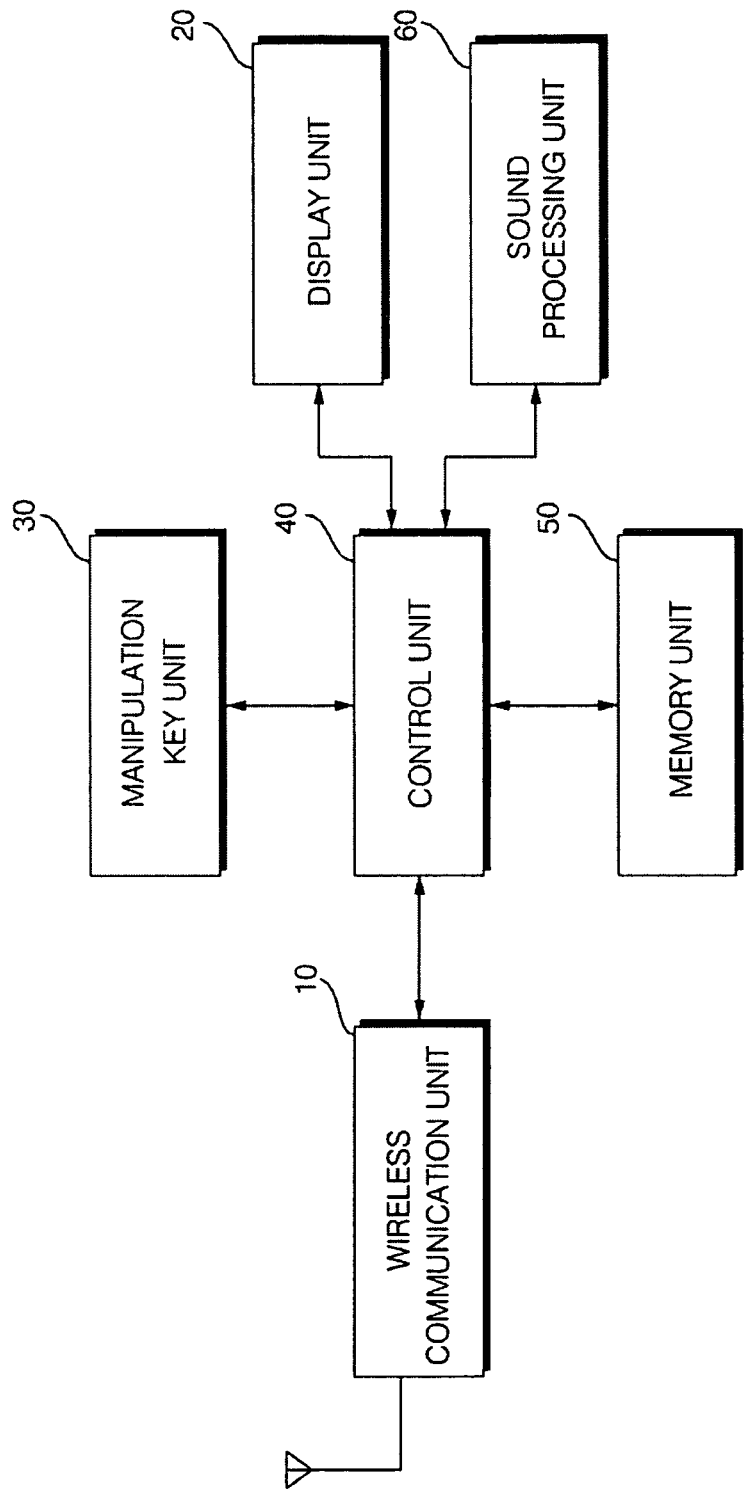
FIG. 1 is a block diagram illustrating a mobile communication terminal according to an embodiment of the present invention.

Turning first to FIG. 1, which is a block diagram illustrating a mobile communication terminal according to an embodiment of the present invention. As shown, the terminal includes a wireless communication unit 10, a display unit 20, a manipulation key unit 30, a control unit 40, a memory unit 50, and a sound processing unit 60.

The display unit 20 displays a status of the terminal in addition to a variety of other information. The display unit 20 also displays menus used to control an operation of the mobile terminal so as to allow the user to input an operation command into the terminal. In addition, the display unit 20 may include a liquid crystal display (LCD) and an LCD driver. Alternatively, the display unit 20 may include a touch screen panel and a touch screen panel controller. Accordingly, the user can input an operation command into the mobile terminal via the display unit 20.

Further, when the display unit 20 includes a touch screen panel and a touch screen panel controller, the control unit 40 monitors whether or not the user has touched the touch screen panel. For example, if the user touches the touch screen at a particular position (e.g., on a soft key or scroll bar)), the control unit 40 performs a function corresponding to the touched portion of the touch screen.

The manipulation key unit 30 includes, for example, a keypad and a keypad controller, which transmits a signal corresponding to the manipulation of the key unit 30. For example, the user may input an operation command into the terminal by pressing one or more keys included in the manipulation key unit 30. The manipulation key unit 30 also includes keys for making or receiving a call or for terminating a call. In addition, when the display unit 20 includes the touch screen panel and corresponding controller, the manipulation key unit 30 can be omitted. That is, the control unit 40 can control an operation of the mobile communication terminal according to touch input to the display unit 20.

In addition, the sound processing unit 60 amplifies a sound signal output by the control unit 40 and outputs the amplified sound signal to, for example, speakers. Further, the sound processing unit 60 converts a sound signal input via, for example, a microphone, into an electrical signal and transmits the electrical signal to the control unit 40.

Also, the memory unit 50 stores programs and data used for operating the terminal, as well as other data the user wants to store. Further, the wireless communication unit 10 provides an interface for wireless communication with a base station through an antenna, and includes, for example, a duplex filter for filtering a signal received through the antenna, a power amplifier for amplifying a transmit signal, a frequency up-converter circuit in a transmission path, and a frequency down-converter circuit in a reception path. In addition, the control unit 40 provides a web page using web page data received by the wireless communication unit 10 or web page data stored in the memory unit 50 and controls the display unit 20 to display the web page.

Figure 2:
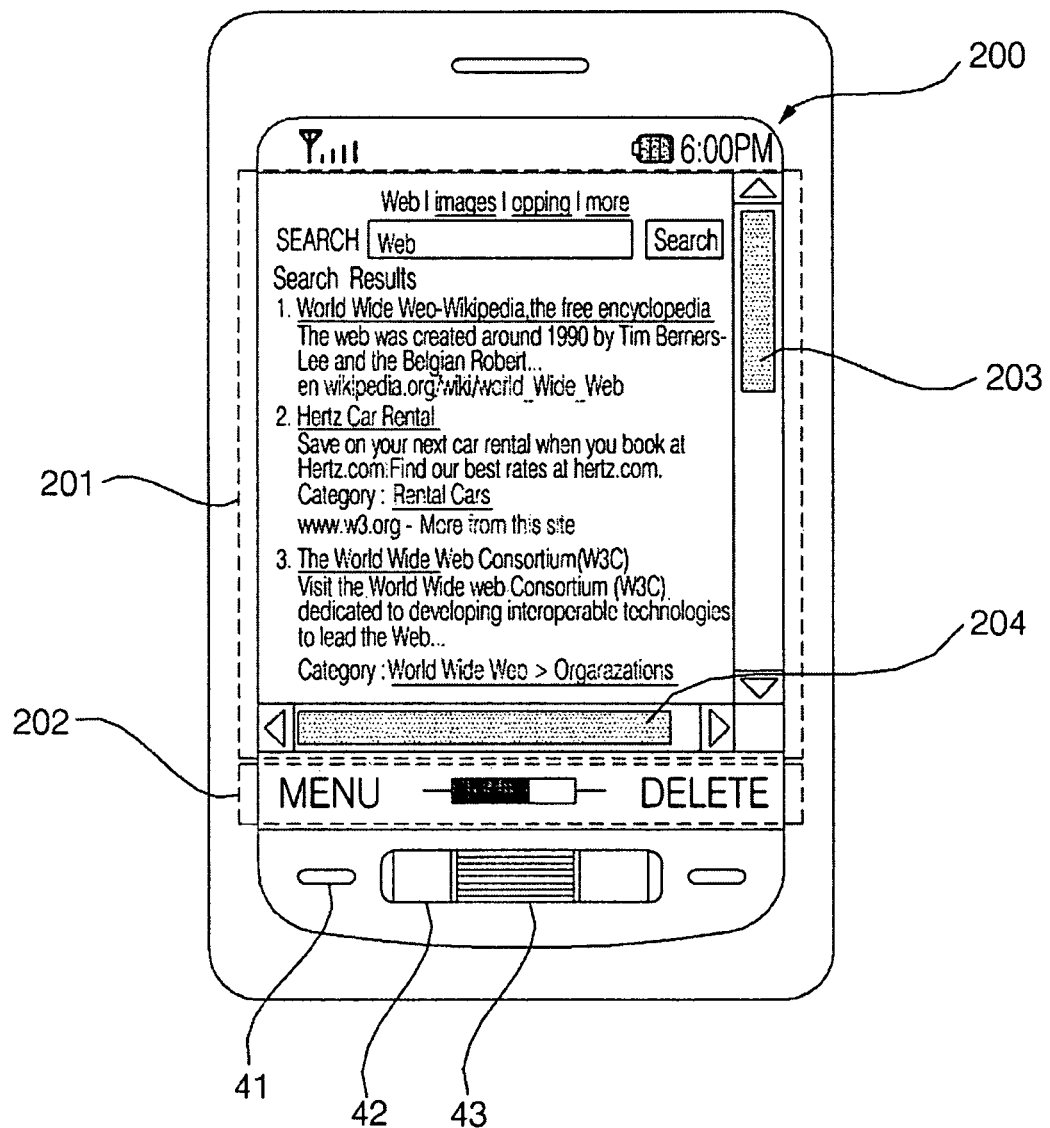
FIG. 2 is an overview of a mobile terminal displaying a web page according to an embodiment of the present invention.

Turning next to FIG. 2, which is an overview illustrating a web page displayed by the display unit 20 under the control of the control unit 40 according to an embodiment of the present invention. FIG. 1 will also be referred to in this description. As shown in FIG. 2, a size of a screen 200 of the display unit 20 is limited. Therefore, when a web page to be displayed is larger than the screen 200, only part of the web page is displayed in a first display window 201. Further, the control unit 40 also displays a vertical scroll bar 203 and a horizontal scroll bar 204 for scrolling the web page. That is, when a slider in the vertical or horizontal scroll bar 203 or 204 is manipulated, the web page displayed on the screen 200 is moved accordingly.

In addition, the control unit 40 also displays a second display window 202 on the screen 200. As shown, the second display window 202 includes one or more soft keys and icons. More specifically, the second display window 202 may include a soft key for popping up a menu window for Internet services, an icon indicating a state of received data via the Internet, and a soft key for returning to a previous menu.

However, the second display window 202 need not necessarily be displayed. In other words, only a web page may be displayed on the screen 200 without displaying the second display window 202. Also, the types of soft keys and icons displayed in the second display window 202 may be altered within the scope of the present invention.

The manipulation key unit 30 in FIG. 2 includes keys 41, 42 and 43 which are displayed at the bottom of the screen 200. Further, when a soft key is displayed on the screen 200, the user may input a command to the mobile terminal using any of the keys 41, 42 and 43 that corresponds to the soft key. In addition, the key 43 can be a wheel key, and the key 42 disposed on one side of the wheel key 43 can be a side key. The wheel key 43 and the side key 42 can also serve as navigation keys. The key 41 can be a selection or enter key, for example.

In addition, when the wheel key 43 is manipulated, the slider in the vertical scroll bar 203 is vertically moved in accordance with the manipulation of the wheel key 43. Then, the control unit 40 scrolls up or down a web page displayed on the screen 200 in accordance with the movement of the slider in the vertical scroll bar 203. When the side key 42 is manipulated, the slider in the horizontal scroll bar 204 is horizontally moved in accordance with the manipulation of the side key 42. Then, the control unit 40 scrolls the web page displayed on the screen 200 to the left and right in accordance with the movement of the slider in the horizontal scroll bar 204.

Figure 3:
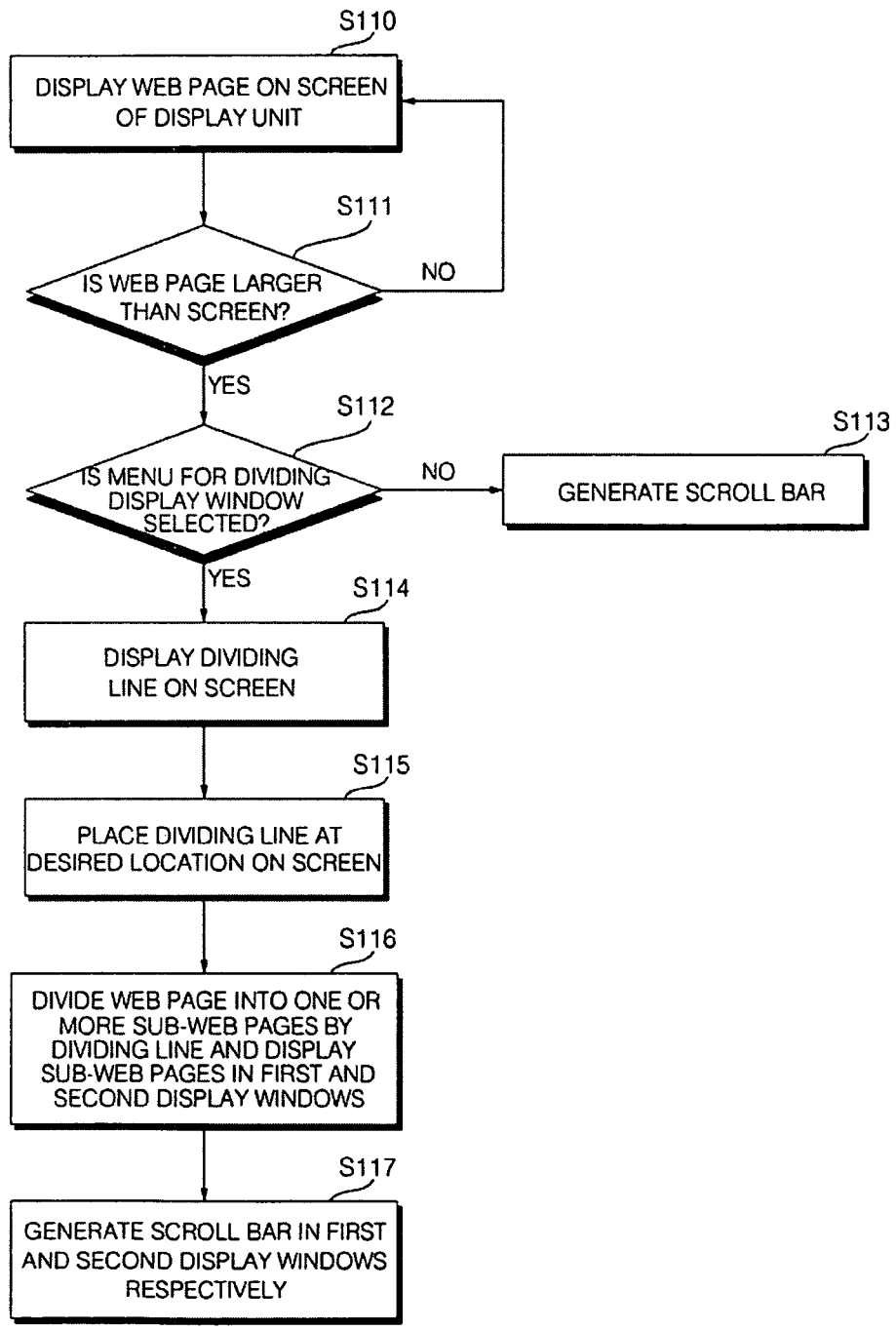
FIG. 3 is a flowchart illustrating a method of controlling a mobile communication terminal according to an embodiment of the present invention.

Next, FIG. 3 is a flowchart illustrating a method of controlling a mobile terminal according to an embodiment of the present invention FIG. 1 will also be referred to in this description. As shown in FIG. 3, the control unit 40 displays a web page on the screen 200 of the display unit 20 (S110). In addition, because the size of the screen 200 is limited, the control unit 40 determines whether the web page is larger than the screen 200 of the display unit 20 (S111).

When the web page is not larger than the screen 200 of the display unit 20 (No in S111), the control unit 40 maintains a current state of display of the web page as long as no command is input thereto. When the web page is larger than the screen 200 (Yes in S111), the control unit 40 displays a popup window asking the user whether or not he or she wants to divide the web page (S112).

If the user does not want to divide the web page (No in S112), the control unit 40 generates the vertical scroll bar 203 and the horizontal bar 204 and displays the scroll bars on the screen 200 without dividing the web page (see FIG. 2, for example). If the user wants to divide the web page (Yes in S112), the control unit 40 displays a dividing line on the screen 200 so that the web page can be divided into one or more sub-web pages by the dividing line (S114) (see FIG. 7(*a*)).

In addition, the user can then place the dividing line at a desired location on the screen 200 by moving the dividing line vertically or horizontally (S115). Next, the web page is divided into first and second sub-web pages by the dividing line (S116). That is, the first and second sub-web pages are respectively displayed in first and second display windows as illustrated in FIG. 7(*b*). Further, the control unit 40 then generates a scroll bar in the first and second display windows, respectively (S117) (see FIG. 7(*b*)), so that the user can scroll each of the first and second sub-web pages.

Figure 4:
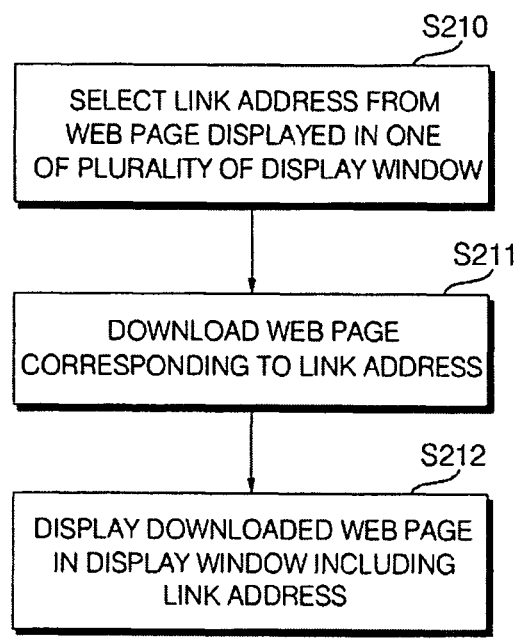
FIG. 4 is a flowchart illustrating a method of controlling a mobile communication terminal according to another embodiment of the present invention.

Turning next to FIG. 4, which is a flowchart illustrating a method of controlling a mobile communication terminal when a user selects text linked to an Internet address from the screen 200 on which more than one display window is displayed according to an embodiment of the present invention. As shown in FIG. 4, the user first selects a link from a web page displayed in one of a plurality of display windows displayed on the screen 200, e.g., a second window (S210). Then, a web page corresponding to the selected link is downloaded onto the mobile communication terminal via the wireless communication unit 10 (S211). The control unit 40 then displays an address to which the downloaded web page is linked in the second window (S212) (see FIG. 11). Accordingly, a plurality of display windows included in a web browser with different addresses can be displayed.

Figure 5:
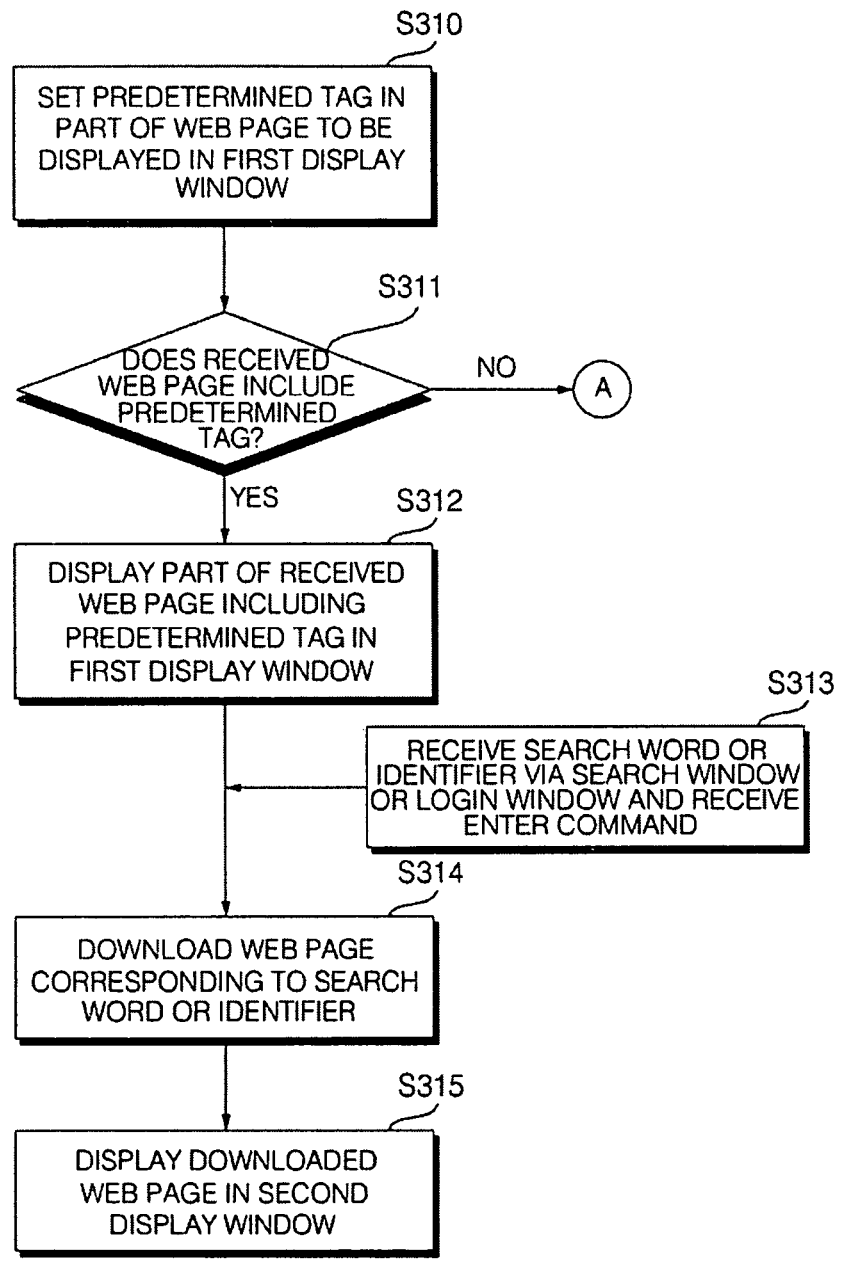
FIG. 5 is a flowchart illustrating a method of controlling a mobile communication terminal according to yet another embodiment of the present invention.

Next, FIG. 5 is a flowchart illustrating a method of controlling a mobile communication terminal when a user inputs a search word to a search window and then inputs an enter command according to an embodiment of the present invention. As shown in FIG. 5, a tag to be inserted into a web page that is to be displayed in a first display window may be set as a default or may be set by a user (S310). That is, the tag is stored in the memory unit 50. Examples of the tag include a search window tag and a login window tag.

Next, the control unit 40 identifies source code of a web page received by the wireless communication unit 10 and determines whether the source code includes the same tag as that stored in the memory unit 50 (S311). When the source code does not include the same tag as that stored in the memory unit 50 (No in S311), the web page is displayed using the method illustrated in FIG. 3.

When the source code includes the same tag as that stored in the memory unit 50 (Yes in S311), the control unit 40 displays part of the web page including the same tag as that stored in the memory unit 50 in the first display window (S312). Next, the user types a search word or an identifier in a search window or in a login window and then inputs an enter command (S313). A web page corresponding to the search word or the identifier is then downloaded onto the mobile communication terminal via the wireless communication unit 10 (S315).

Figure 12:
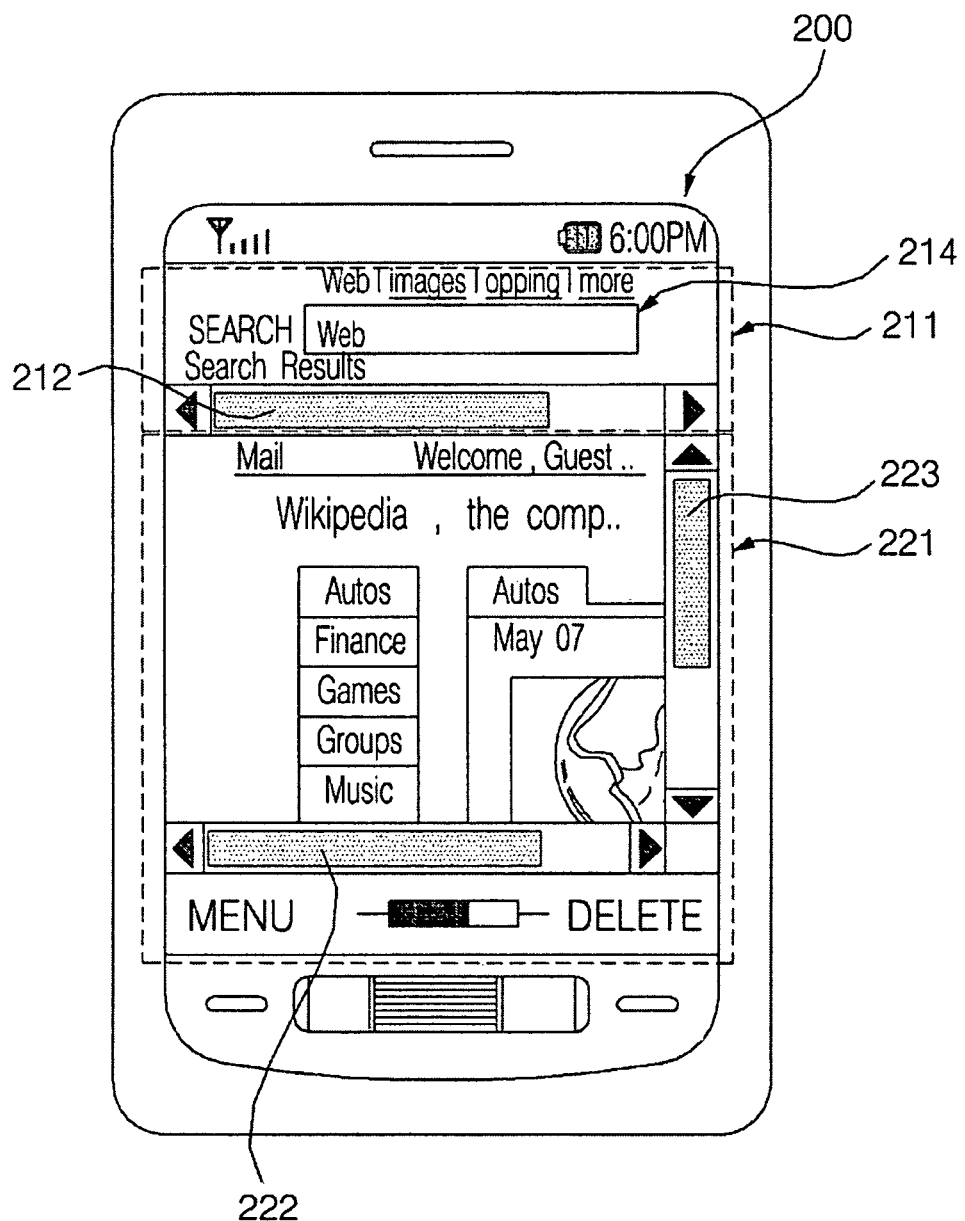
FIG. 12 is an overview of a mobile terminal displaying a search window and corresponding web page according to an embodiment of the present invention.

That is, in the step S315, the control unit 40 displays the downloaded web page in a second display window as illustrated in FIG. 12. As a result, the user can search results to be displayed in the second window while leaving the search window in the first display window as it is even after the division of the screen 200 into the first and second display windows.

Figure 6:
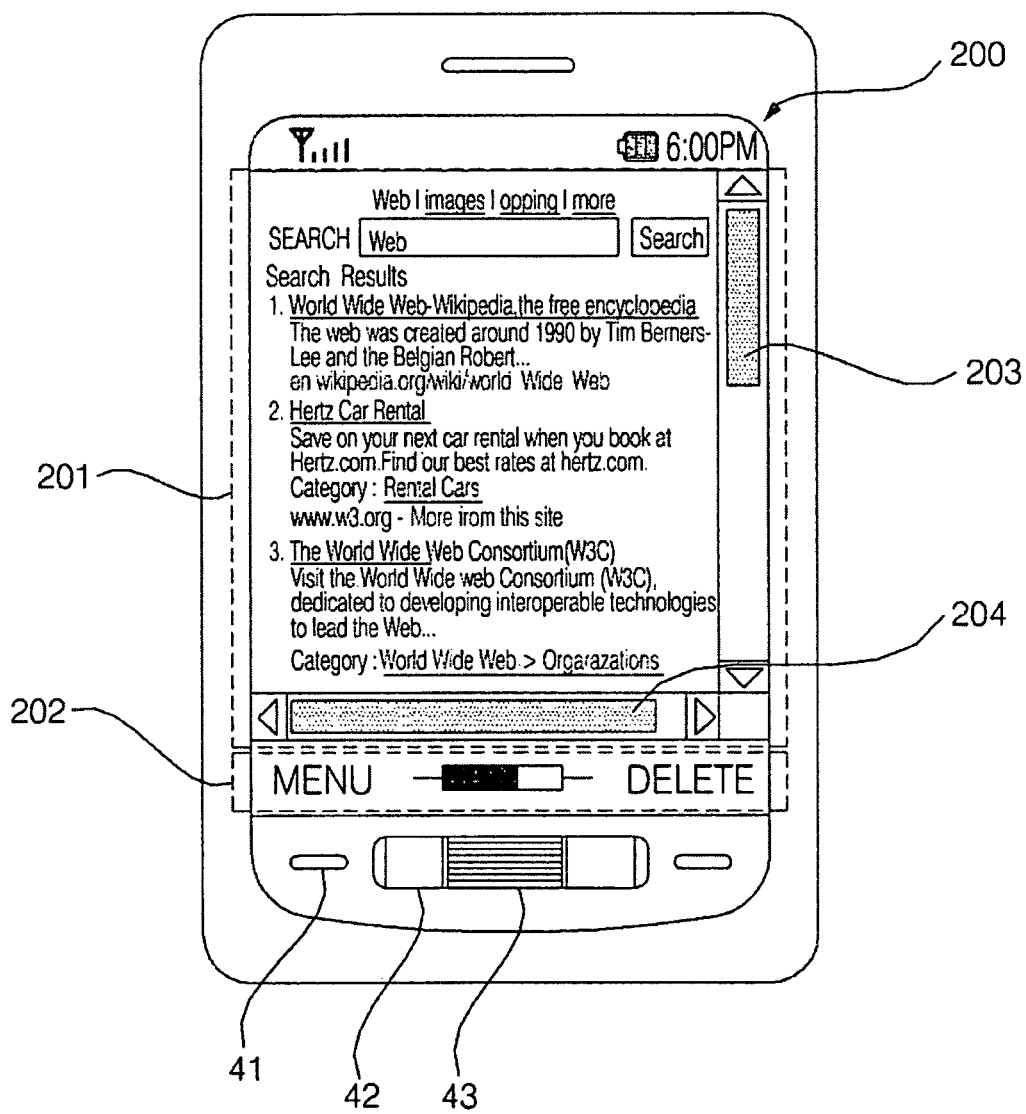
FIG. 6 is an overview of a mobile terminal displaying a web page according to an embodiment of the present invention.

In addition, the display of a web page on the screen 200 of the display unit 20 according to an embodiment of the present invention will now be described in further detail. In more detail, FIG. 6 is an overview of a terminal that displays a web page on the screen 200 of the display unit 20. FIG. 1 will also be referred to in this description. Further, in FIG. 6, the web page may be a web page received by the wireless communication unit 10 or a web page previously stored in the memory unit 50.

The control unit 40 executes a web browser and determines whether a web page to be displayed is larger than the screen 200 of the display unit 20 before displaying the web page in a web browser display window. As discussed above, when the web page to be displayed is larger than the screen 200, the control unit 40 generates a dividing line according to default settings, for example, and displays the dividing line on the web browser display window so that the screen 200 can be divided into one or more sub-screens. That is, the web browser can have a plurality of display windows, which are the sub-screens.

Alternatively, the control unit 40 may generate the dividing line upon the request of the user. More specifically, when the web page to be displayed is larger than the screen 200, the control unit 40 displays on the screen 200 a menu window asking the user whether or not he or she wants to divide the screen 200. If the user inputs a command to divide the screen 200 on the menu window, the control unit 40 generates the dividing line in response to the command input by the user. In short, the control unit 40 may generate the dividing line only when the user wants to divide the screen 200.

Figure 7A:
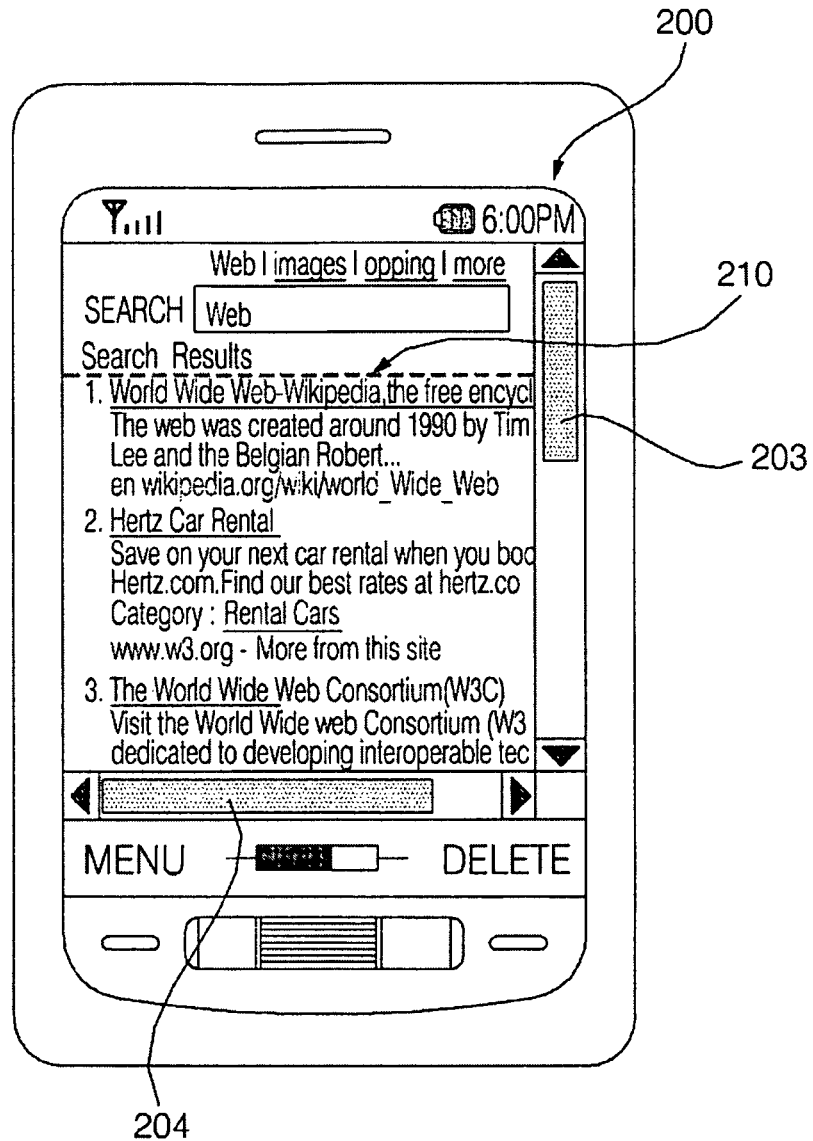
FIGS. 7(*a*) and 7(*b*) are overviews of a mobile terminal dividing a web page according to an embodiment of the present invention.
Figure 7B:
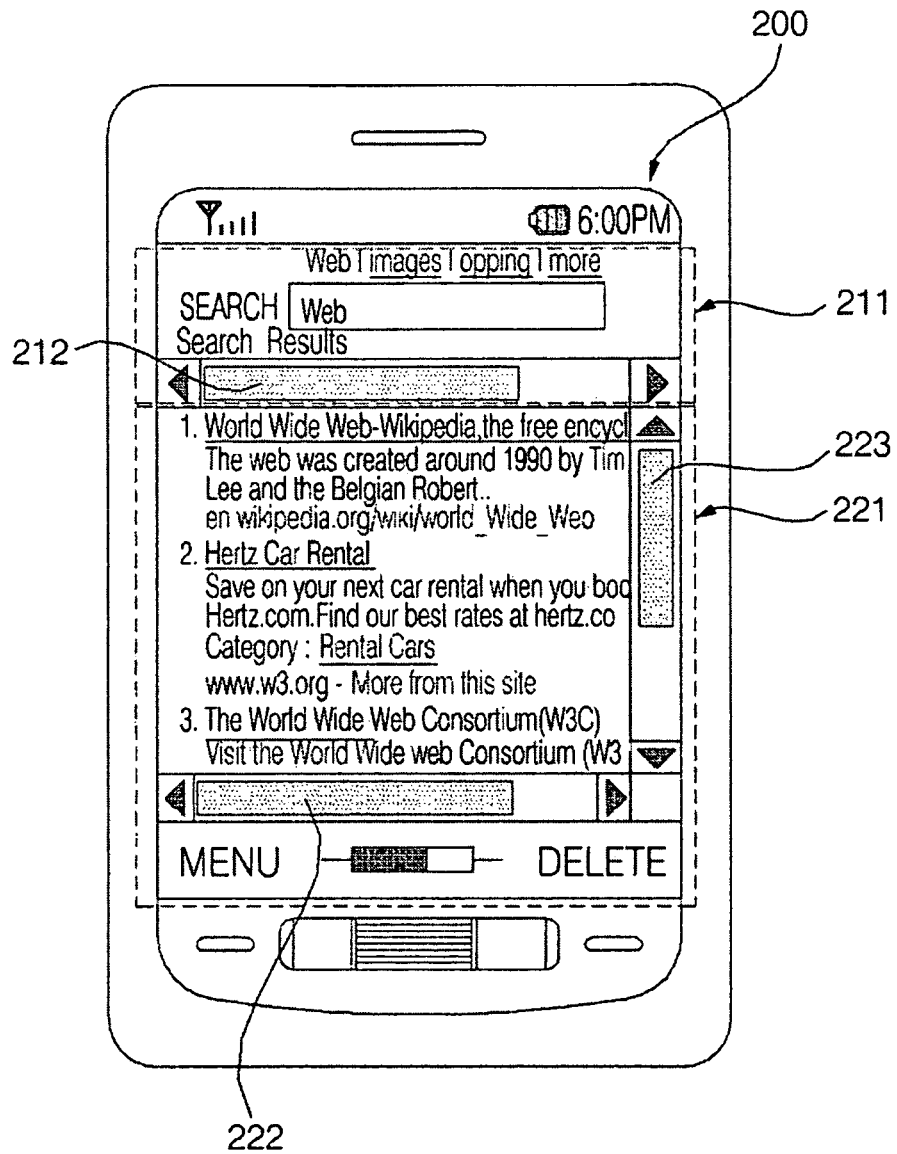

Next, FIGS. 7(a) and 7(b) are overviews of a terminal in which a dividing line on the screen 200 is generated and the screen 200 is divided by the dividing line. More specifically, FIG. 7(a) illustrates displaying a web page which is larger than the screen 200. Referring to FIG. 7(a), when the web page is larger than the screen 200, the control unit 40 generates the vertical scroll bar 203 for scrolling up and down the web page and the horizontal scroll bar 204 for scrolling the web page to the left and right and also generates a dividing line 210.

The dividing line 210 may be vertically moved using the wheel key 43 illustrated in FIG. 2. When the dividing line 210 is a vertical line, the dividing line 210 may be moved using the side key 42. Further, when the display unit 20 is a touch screen, the user may place the dividing line 210 at any desired location on the screen 20 by touching and dragging the dividing line 210.

In addition, if the user inputs a command to divide the screen 200 by manipulating, for example, an enter key, the control unit 40 divides the web page in a web browser into one or more sub-web pages by the dividing line 210 and respectively displays the sub-web pages in a first display window 211 and a second display window 221. A scroll bar is then generated in the first display window 211 and/or the second display window 221 according to the sizes of the sub-web pages. More specifically, as shown in FIG. 7(b), a horizontal scroll bar 212 is generated in the first display window 211 so that the sub-web page displayed in the first display window 211 can be scrolled to the left and right, and a vertical scroll bar 223 and a horizontal scroll bar 222 are generated in the second display window 221 so that the sub-web page displayed in the second display window 221 can be scrolled up and down and to the left and right.

Figure 8:
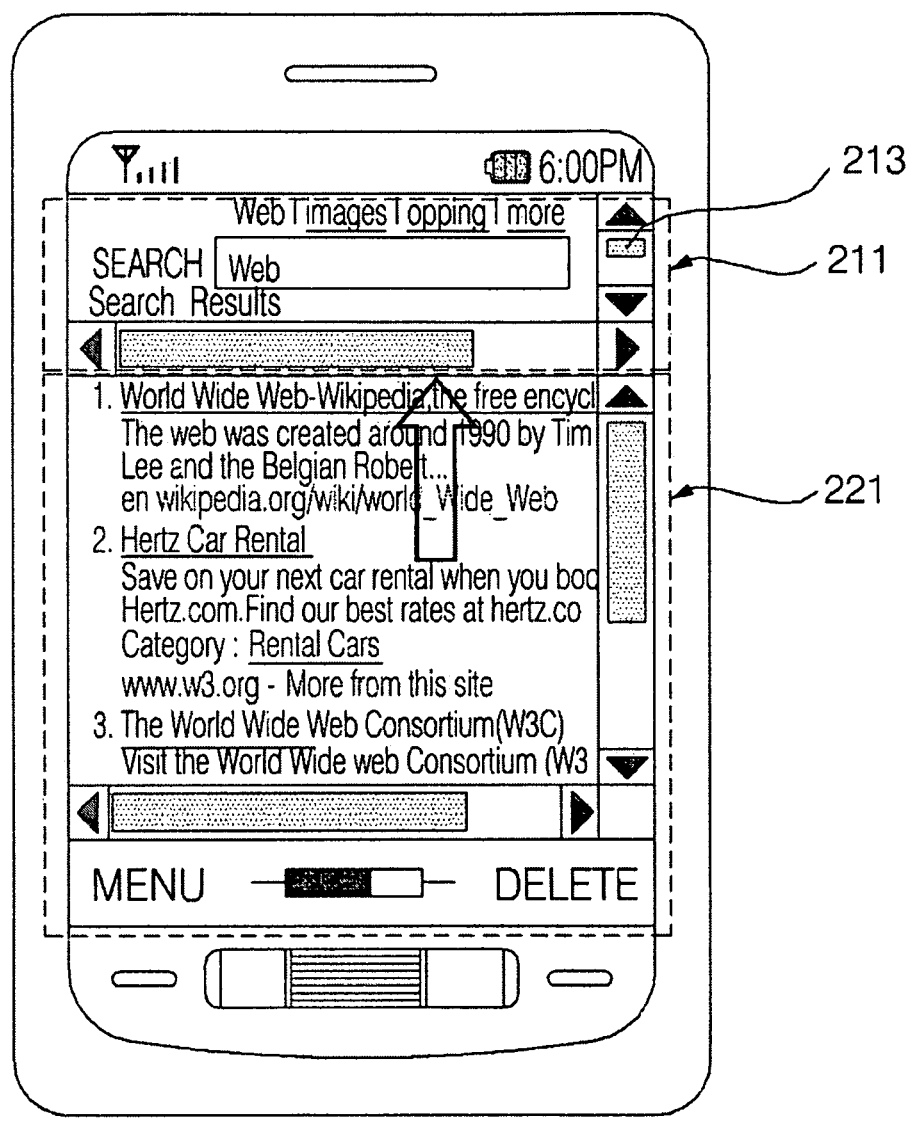
FIG. 8 is an overview of a mobile terminal illustrating a divided web page being moved according to an embodiment of the present invention.

Further, the sizes of the first and second display windows 211 and 221 may be altered, and this will hereinafter be described in detail with reference to FIG. 8. In more detail, and as shown in FIG. 8, the boundary between the first display window 211 and the second display window 221 may be vertically moved by manipulating a predefined key. Alternatively, when the display unit 20 is a touch screen, the sizes of the first display window 211 and the second display window 221 may be adjusted by touching and dragging the boundary between the first display window 211 and the second display window 221 on the touch screen.

In addition, when the size of the second display window 221 is increased, the size of the first display window 211 is reduced accordingly, and a horizontal scroll bar 213 is generated in the first display window 211 so that the sub-web page displayed in the first display window 211 can be scrolled up and down.

Figure 9:
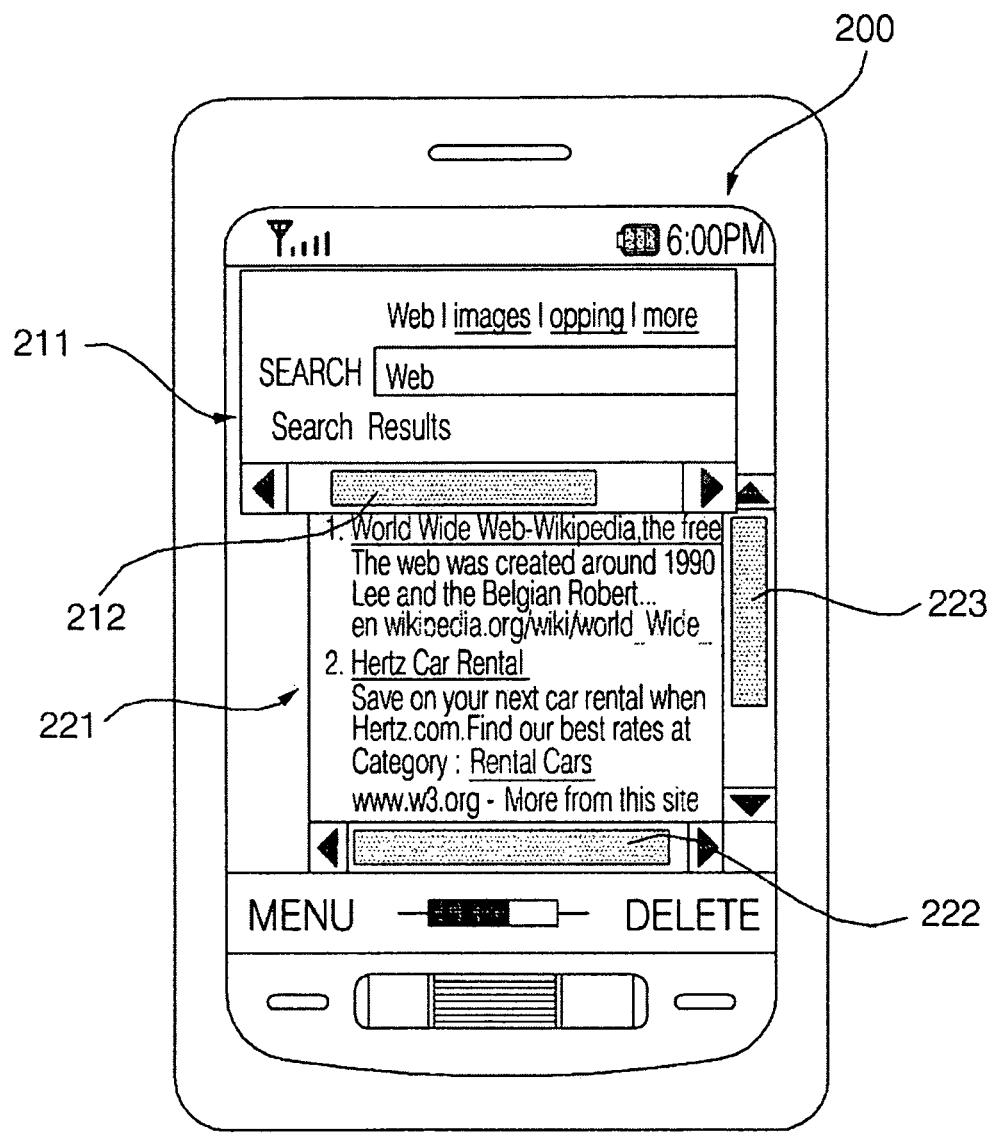
FIG. 9 is an overview of a mobile terminal displaying first and second display windows in a overlapping manner according to an embodiment of the present invention.
Figure 10:
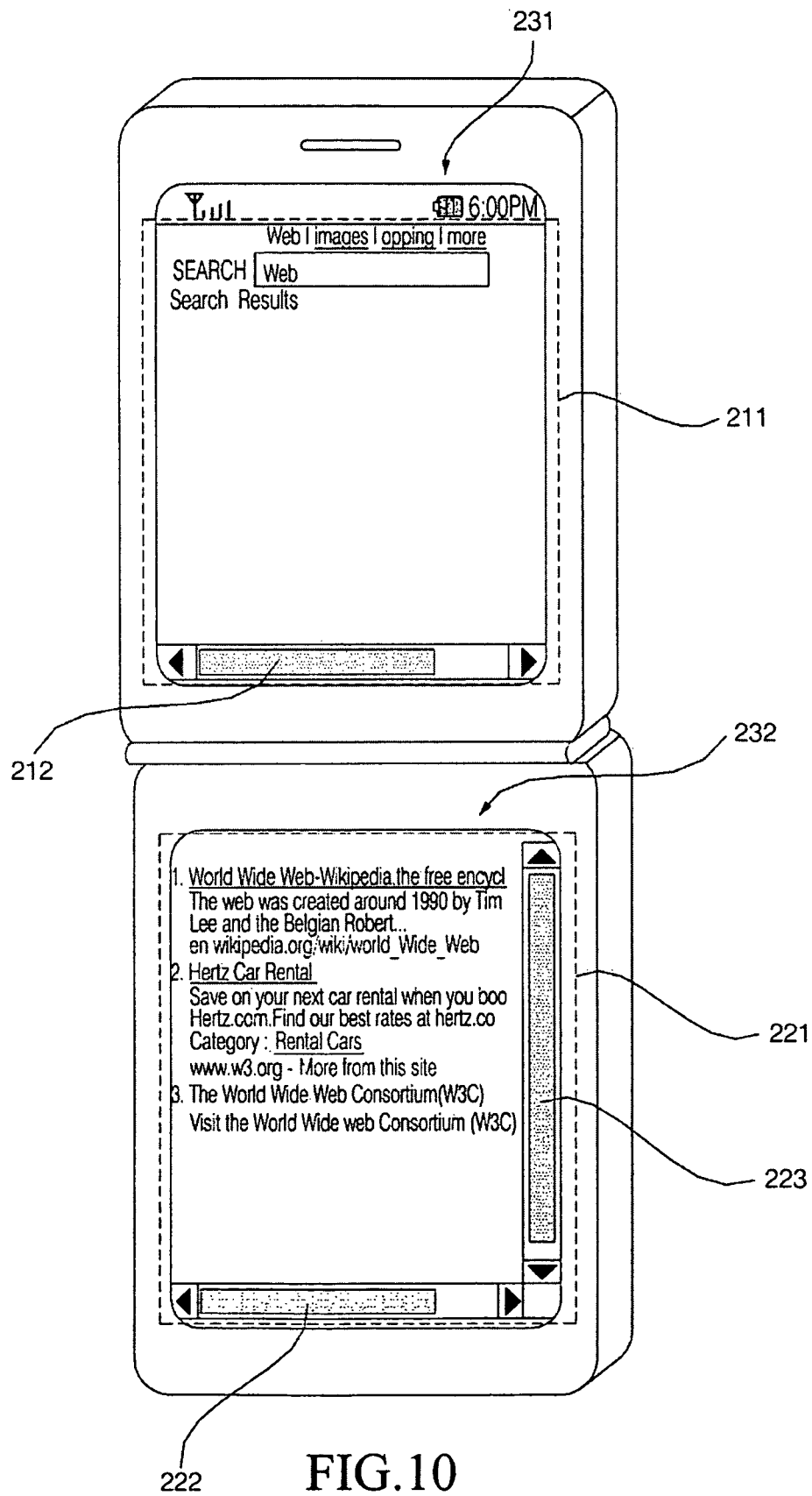
FIG. 10 is an overview of a mobile terminal displaying first and second display windows on two display units according to an embodiment of the present invention.

Turning next to FIGS. 9 and 10, which are an overview of a terminal including the first and second display windows 211 and 221 according to other embodiments of the present invention. As shown in FIG. 9, when the display unit 20 is a touch screen, a user may separate the first display window 211 and the second display window 221 by manipulating a predefined key or by using a predefined touch manner. In addition, the first display window 211 and the second display window 221 may be respectively displayed on a first screen 231 and a second screen 232 as in FIG. 10, by appropriately dragging the first display window 211 and the second display window 221. In addition, when the first and second display windows overlap one another, the top display window can be displayed as a transparent window.

Figure 11A:
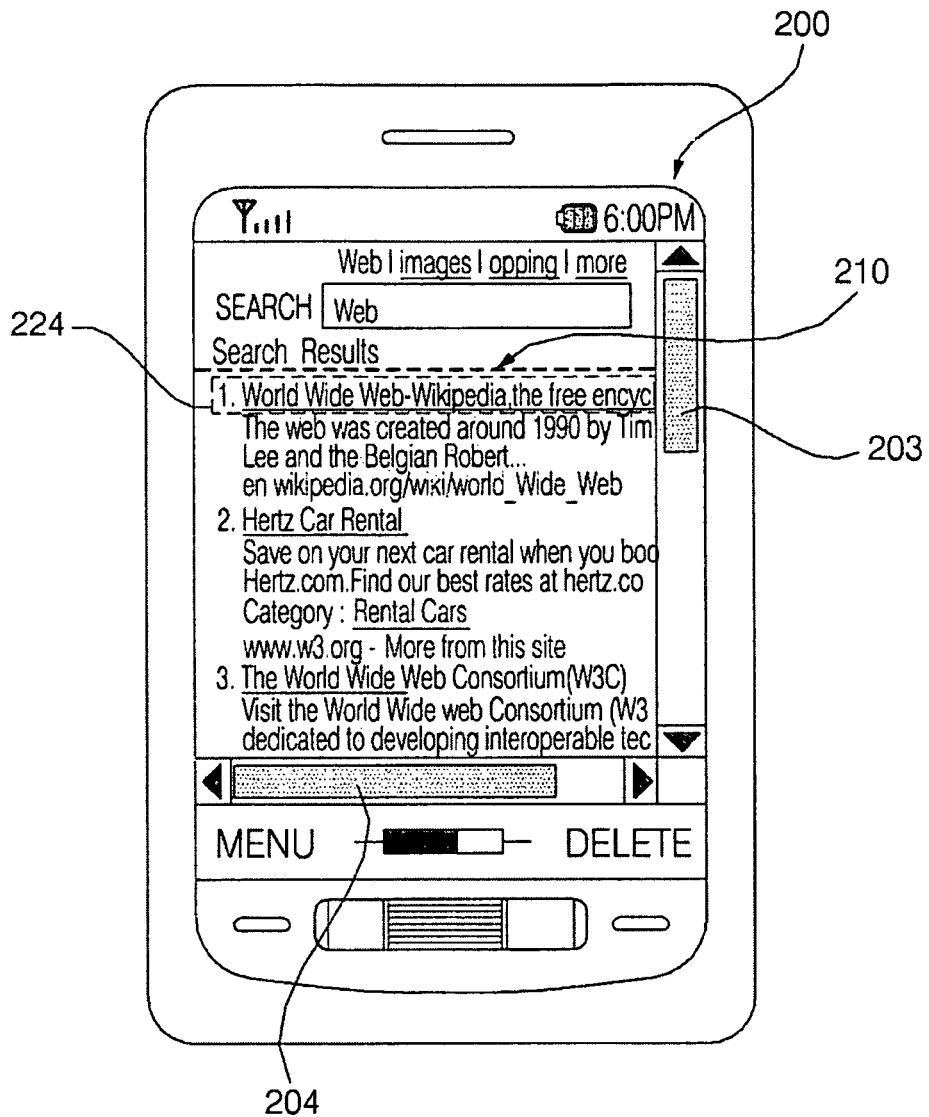
FIGS. 11(*a*) and 11(*b*) are overviews of a mobile terminal illustrating first and second display windows when a web page currently being displayed is divided and then a new web page is received according to an embodiment of the present invention.
Figure 11B:
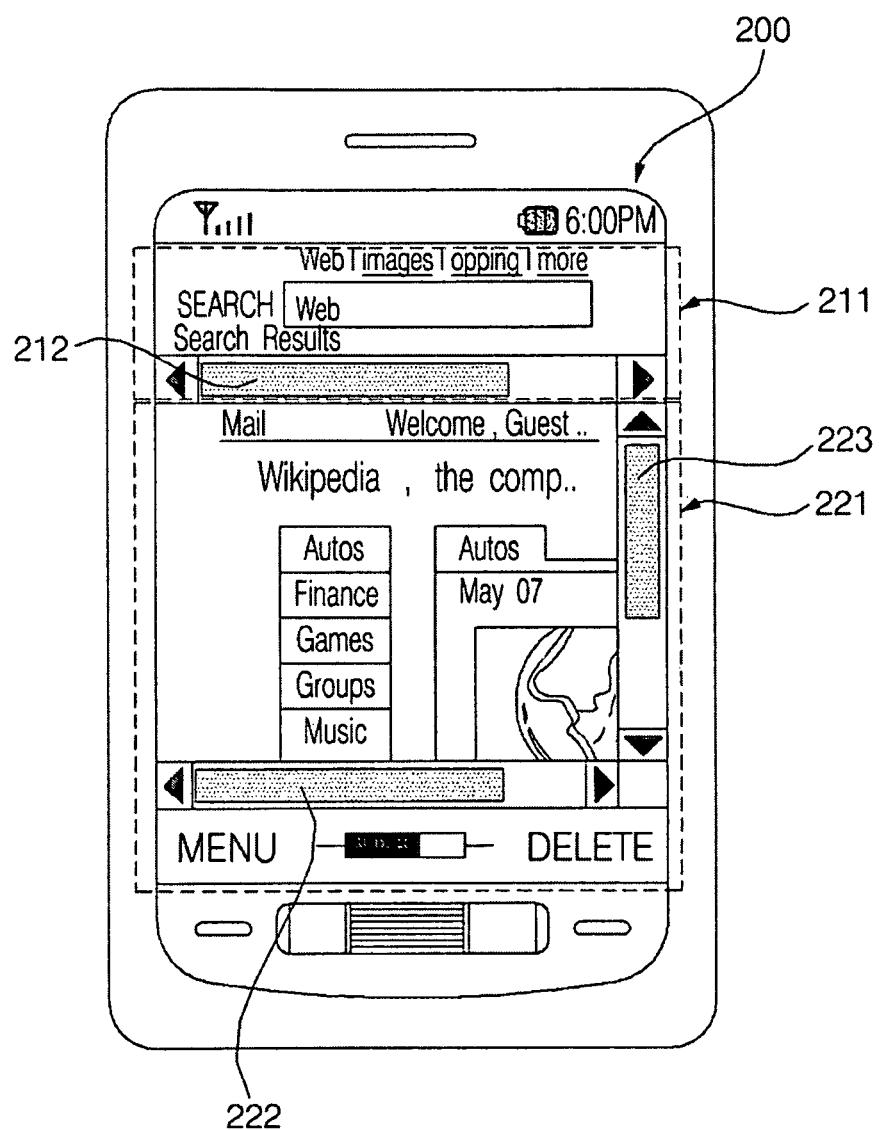

Next, FIGS. 11 and 12 are overviews of terminals including the first and second display windows 211 and 221 when a web page currently being displayed is divided and then a new web page is received according to an embodiment of the present invention. Referring to FIG. 11(a), a user may select a predetermined area 224 in the second display window 221 using a tab key or a navigation key. When the predetermined area 224 includes text linked to an Internet address, a web page corresponding to the Internet address is downloaded onto the mobile communication terminal via the wireless communication unit 10 when the predetermined area 224 is selected.

The control unit 40 then displays the downloaded web page in the second display window 221. Therefore, the user can replace a web page currently being displayed in the second display window 221 with another web page while leaving a web page currently being displayed in the first display window 211 as it is.

Further, FIG. 12 illustrates a situation when a user inputs a search word to the first display window 211 including a search window 214 and then inputs an enter command. Referring to FIG. 12, the control unit 40 displays a web page that is received in response to the enter command in a second display window 221 while leaving the search window 214 in the first display window 211 as it is. Therefore, the user can display a web page including search results in the second display window 221 while keeping the search window 214 in the first display window 211 intact.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to divide a web page displayed by a display unit into one or more sub-web pages according to a user command and to selectively provide a scroll bar to the sub-web pages. Therefore, it is possible to effectively display a web page using a display unit even with a small screen.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile communication terminal, the method comprising:
   receiving a web page;
   displaying, via a controller of the mobile communication terminal, a first part of the received web page in an upper display window on a touch screen of the mobile communication terminal;
   displaying, via the controller, a second part of the received web page in a lower display window below the upper display window;
   displaying, via the controller, a dashed dividing line dividing the upper and lower display windows, the dashed dividing line indicating the dashed dividing line can be selected and moved by being touch and dragged on a touch screen of the mobile communication terminal and thereby enlarging and reducing the upper and lower display windows as the dividing line is touched and dragged;
   selecting a webpage in the second part of the received web page displayed in the lower display window;
   accessing the webpage and replacing the second part of the web page displayed in the lower display window with a web page corresponding to the web page link without changing the first part of the received web page displayed in the upper display window;
   displaying a window asking the user whether to divide the web page when the web page is larger than screen; and
   receiving a command from a user to divide the received web page,
   wherein the displaying step displays the upper and lower display windows in response to the command to divide the received web page.

2. The method of claim 1, further comprising:
   increasing or reducing a size of the lower display window based on the dashed dividing line being touched and dragged on the touch screen of the mobile communication terminal.

3. The method of claim 2, wherein when the size of the lower display window is increased, the method further comprises reducing a size of the upper display window according to the increase in the size of the lower display window.

4. The method of claim 1, wherein the displaying step comprises displaying the upper display window to overlap with the lower window.

5. The method of claim 4, wherein the upper display window overlapping the lower display window is displayed as a semi-transparent window so the lower display window can be viewed.

6. The method of claim 1, wherein the display screen comprises at least upper and lower display screens, and the displaying step displays the upper display window on the upper display screen and the lower display window on the lower display.

7. The method of claim 1, further comprising:
   displaying at least one of a vertical scroll bar or a horizontal scroll bar in the upper and lower display windows.

8. The method of claim 1, further comprising:
   displaying a menu window for receiving the command from the user to divide the received web page when the received web page is larger than the display screen of the mobile communication terminal.

9. The method of claim 1, wherein the web page displayed in the upper display window includes a predetermined tag.

10. The method of claim 9, wherein the tag is a search window tag or a login window tag.

11. The method of claim 10, further comprising:
    receiving a search word or an identifier that is typed in the search window or the login window included in the upper display window and receiving an enter command; and
    displaying a web page that is received in response to the enter command in the lower display window.

12. The method of claim 9, further comprising modifying the tag.

13. A mobile communication terminal, comprising:
    a wireless communication unit configured to receive a web page;
    a display unit including a touch screen configured to display an upper display window which displays a first part of the received web page and a lower display window which displays a second part of the received web page; and a control unit configured to display a dashed dividing line dividing the upper and lower display windows, the dashed dividing line indicating the dashed dividing line can be selected and moved by being touch and dragged on the touch screen and thereby enlarging and reducing the upper and lower display windows as the dividing line is touched and dragged, wherein the control unit is further configured to receive a selection signal indicating a selection of a web page link in the second part of the received web page displayed in the lower display window, to access the web page link and to replace the second part of the web page displayed in the lower display window with a web page corresponding to the web page link without changing the first part of the received web page displayed in the upper display window, display a window asking the user whether to divide the web page when the web page is larger than screen, receive a command from a user to divide the received web page, and display the upper and lower display windows in response to the command to divide the received web page.

14. The mobile communication terminal of claim 13, wherein the control unit is further configured to increase or reduce a size of the lower display window based on the dashed dividing line being touched and dragged on the touch screen of the mobile communication terminal.

15. The mobile communication terminal of claim 14, wherein when the size of the lower display window is increased, the control unit reduces a size of the upper display window according to the increase in the size of the lower display window and generates a scroll bar in the upper display window.

16. The mobile communication terminal of claim 13, wherein the control unit controls the display unit to display the upper display window to overlap with the lower display window.

17. The mobile communication terminal of claim 16, wherein the control unit displays the upper display window overlapping the lower display window as a semi-transparent window so the lower display window can be viewed.

18. The mobile communication terminal of claim 13, wherein the display screen comprises at least upper and lower display screens, and the control unit displays the upper display window on the upper display screen and the lower display window on the lower display screen.

19. The mobile communication terminal of claim 13, wherein the control unit is further configured to display at least one of a vertical scroll bar or a horizontal scroll bar in the upper and lower display windows.

20. The mobile communication terminal of claim 13, wherein the control unit controls the display unit to display a menu window for receiving the command from the user to divide the received web page when the received web page is larger than the display screen of the mobile communication terminal.

21. The mobile communication terminal of claim 13, wherein the web page displayed in the upper display window includes a predetermined tag.

22. The mobile communication terminal of claim 21, wherein the tag is a search window tag or a login window tag.

23. The mobile communication terminal of claim 22, wherein the control unit receives a search word or an identifier that is typed in the search window or the login window included in the upper display window, receives an enter command, and controls the display unit to display a web page that is received in response to the enter command in the lower display window.

24. The mobile communication terminal of claim 21, wherein the control unit receives a command from the user to modify the tag.

\* \* \* \* \*